Aug. 13, 1963 E. J. DE RIDDER 3,100,556
INTERLOCKING METALLIC STRUCTURAL MEMBERS
Filed July 30, 1959 8 Sheets-Sheet 3

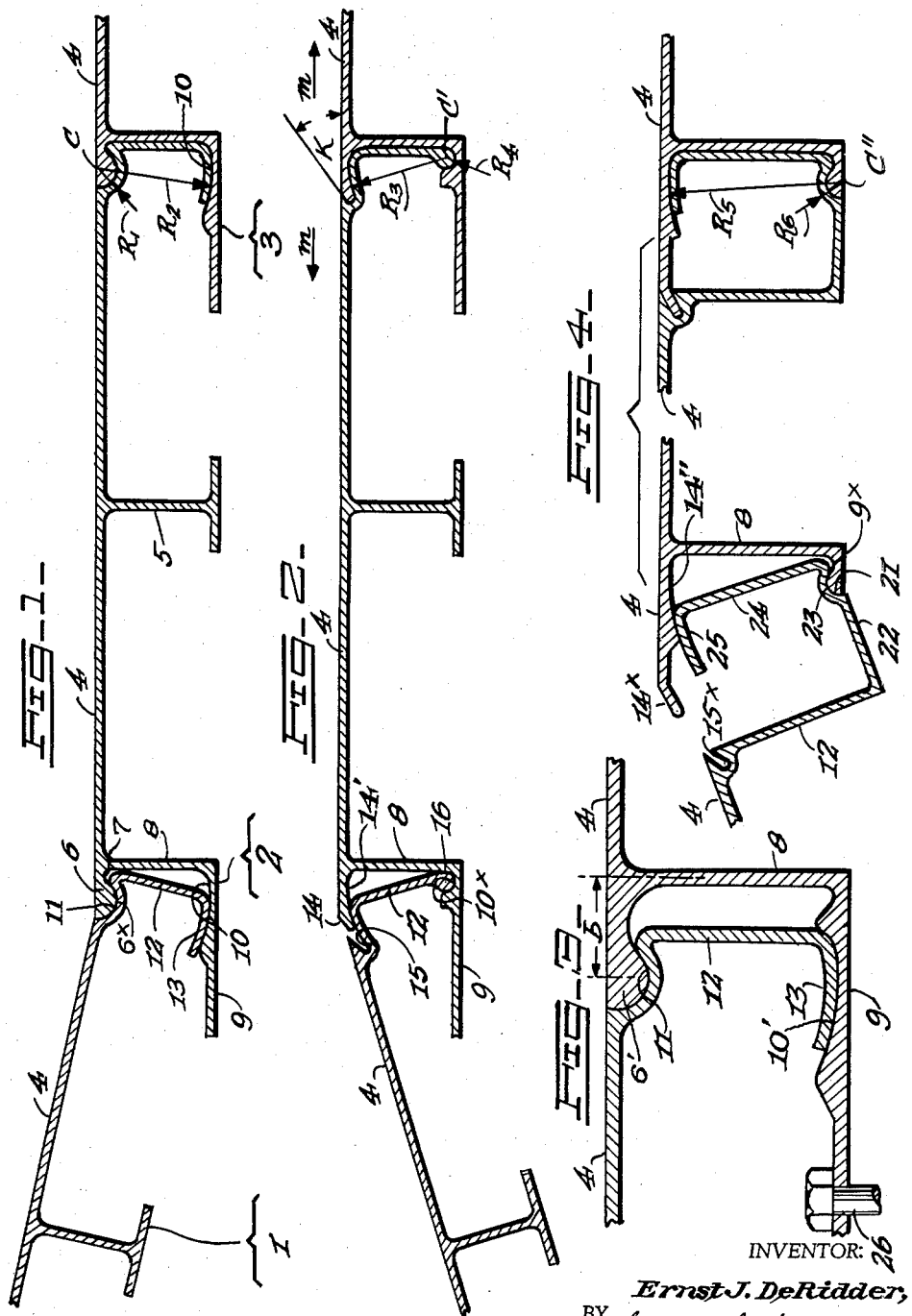

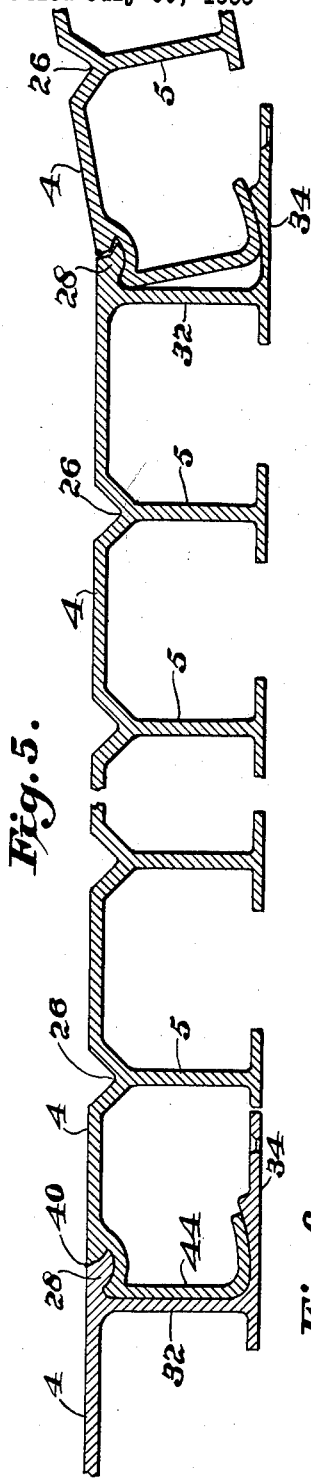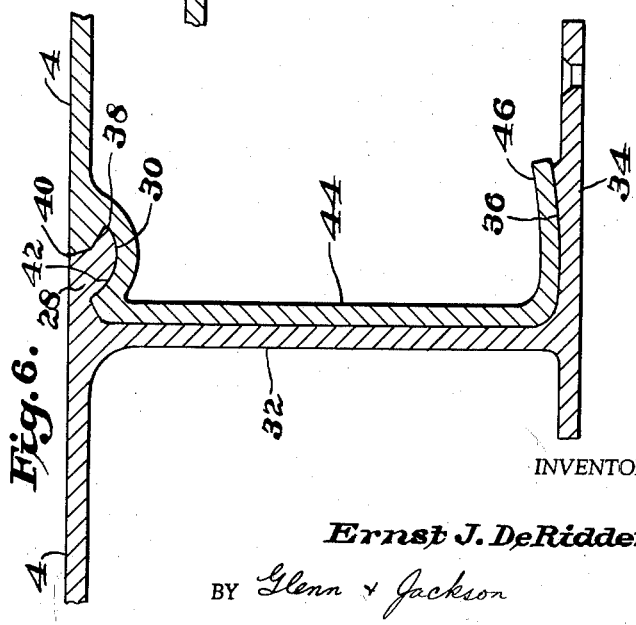

INVENTOR:
Ernst J. DeRidder,
BY Glenn & Jackson

ATTORNEYS.

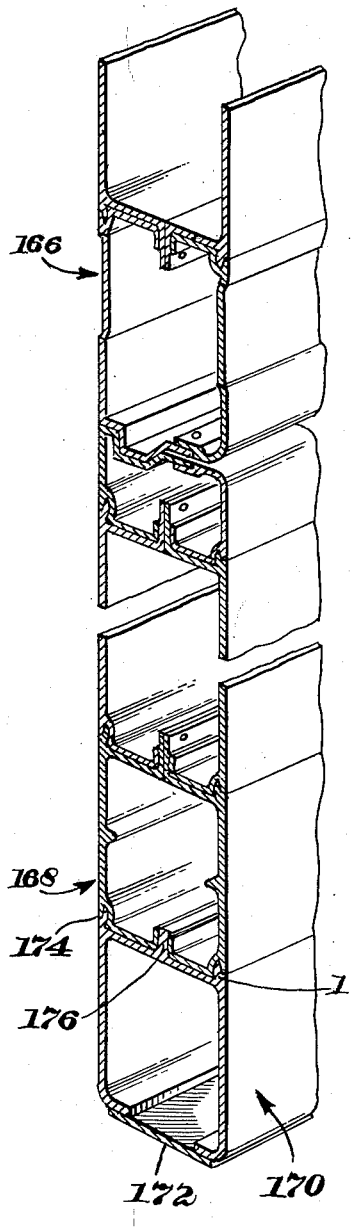
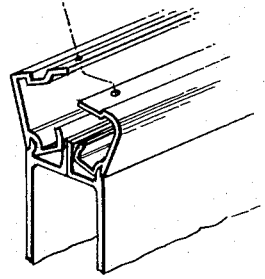
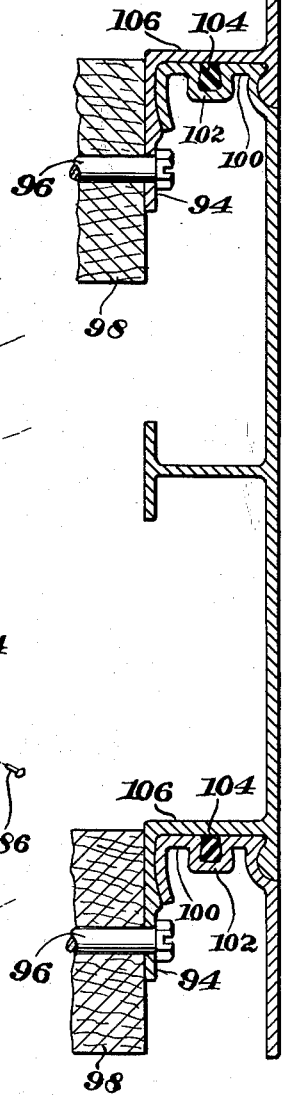
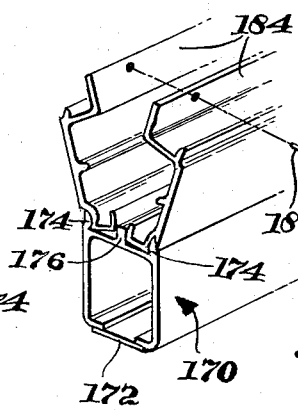

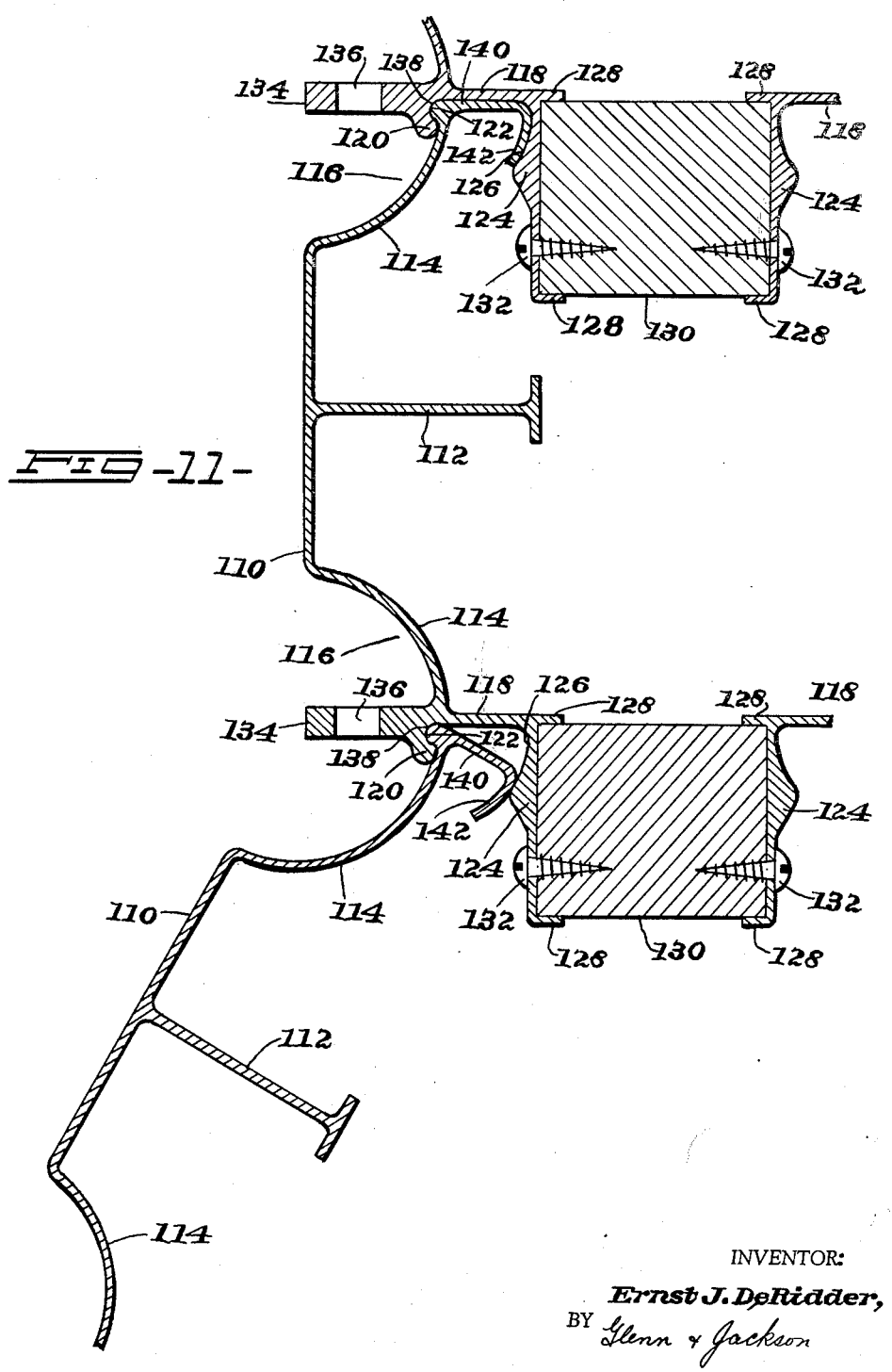

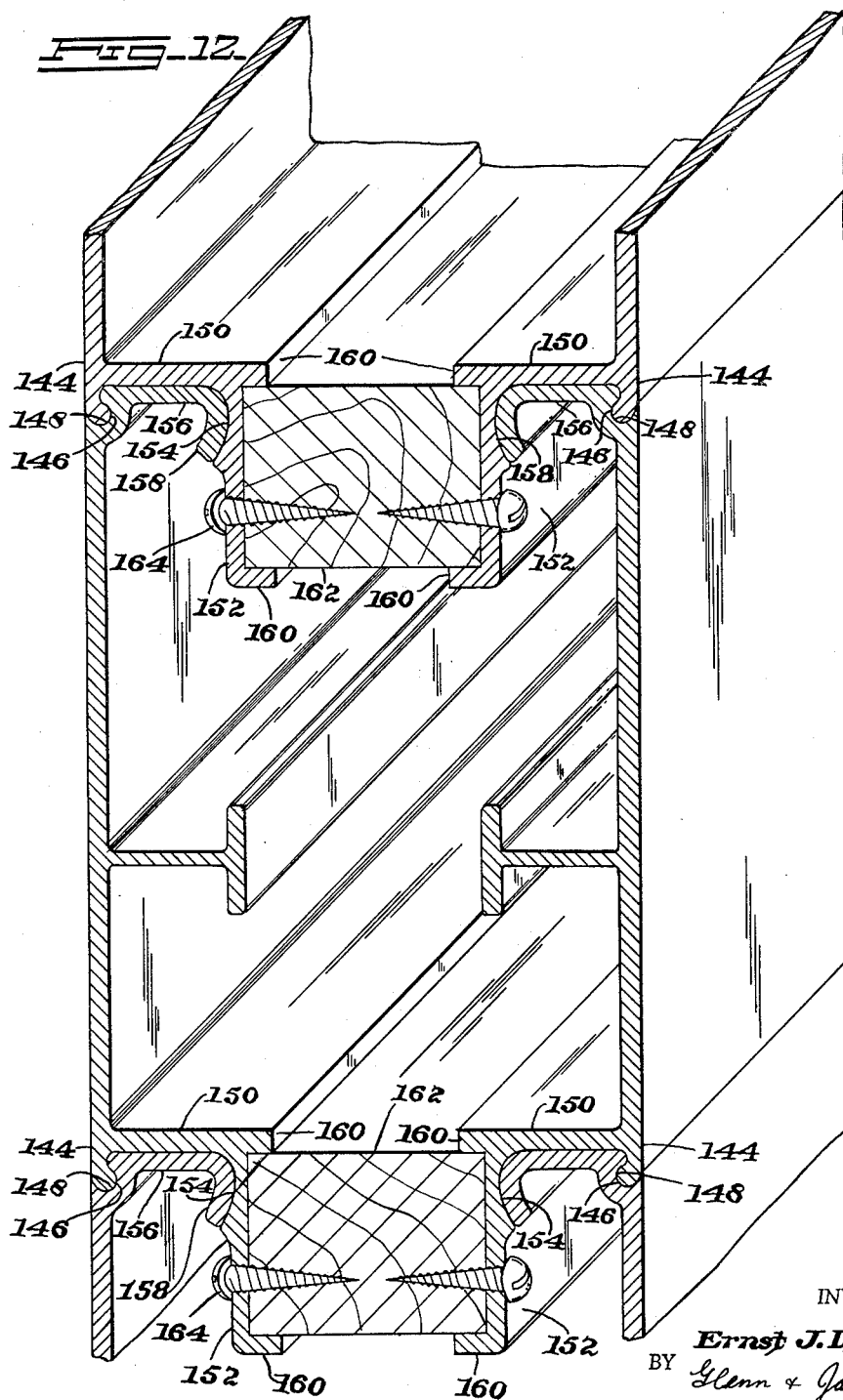

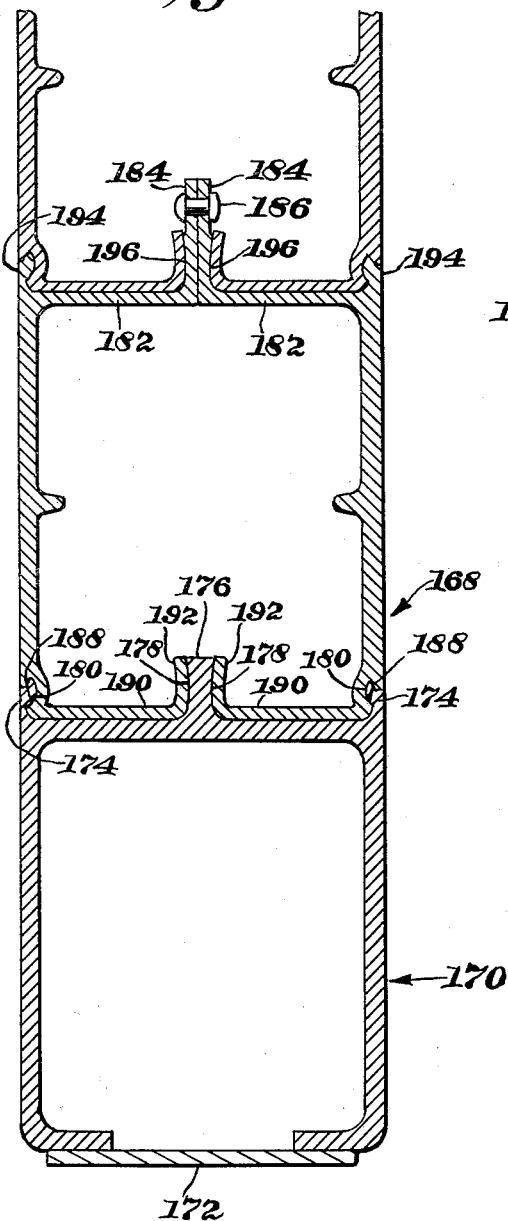
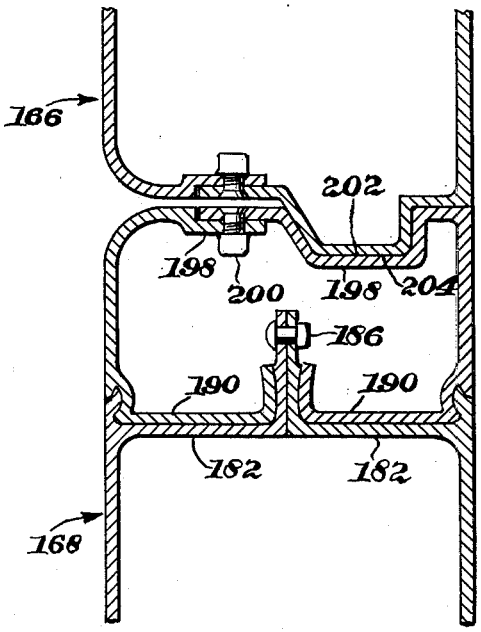
INVENTOR:
Ernst J. DeRidder,
BY Glenn + Jackson
ATTORNEYS

Aug. 13, 1963   E. J. DE RIDDER   3,100,556
INTERLOCKING METALLIC STRUCTURAL MEMBERS
Filed July 30, 1959   8 Sheets-Sheet 8
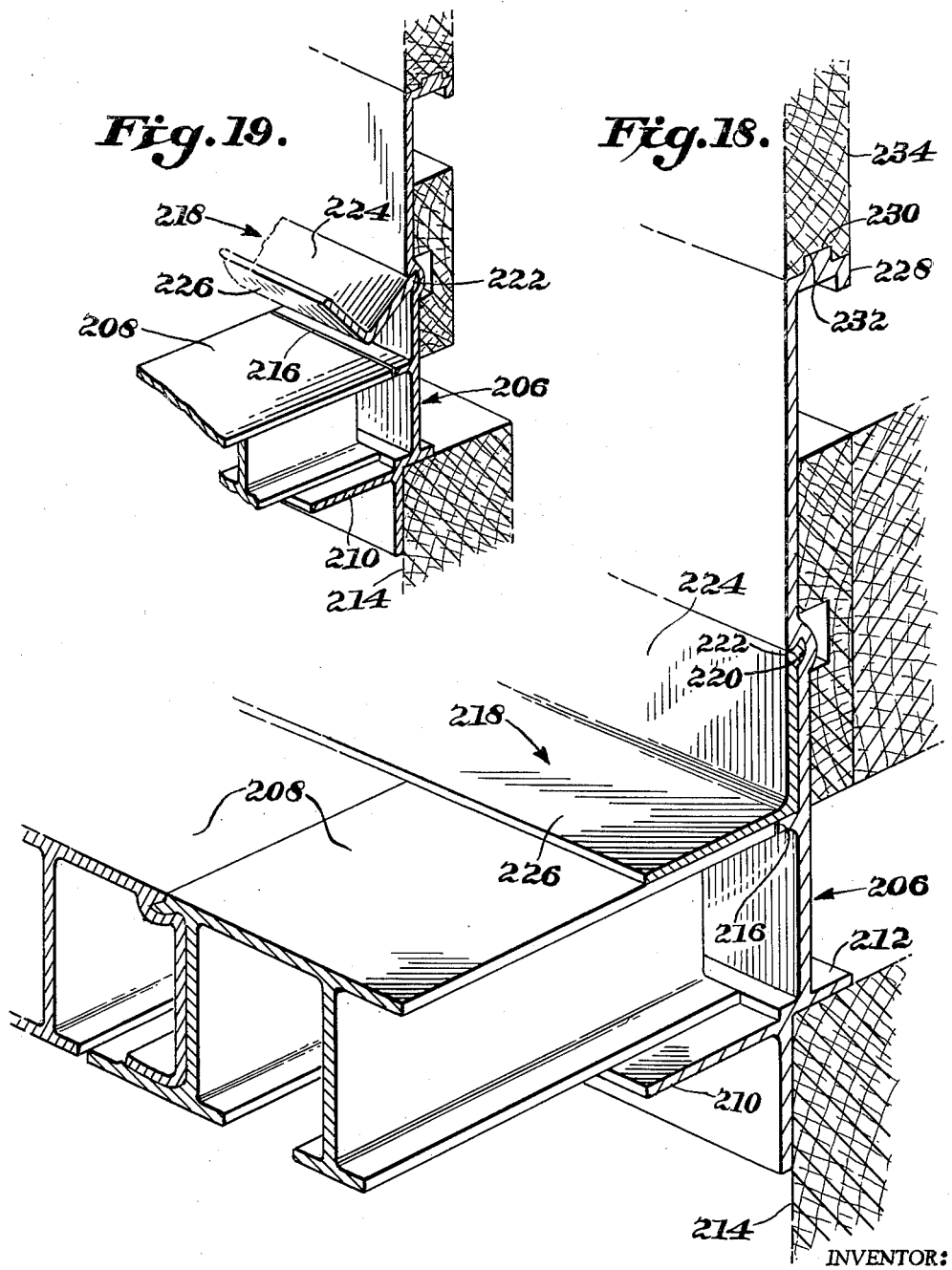
INVENTOR:
Ernst J. DeRidder,
BY Glenn & Jackson
ATTORNEYS.

United States Patent Office
3,100,556
Patented Aug. 13, 1963

3,100,556
INTERLOCKING METALLIC STRUCTURAL MEMBERS
Ernst J. De Ridder, Richmond, Va., assignor to Reynolds Metals Company, Richmond, Va., a corporation of Delaware
Filed July 30, 1959, Ser. No. 830,586
21 Claims. (Cl. 189—34)

This invention relates to metallic structural members especially adapted to be formed by extrusion and having edge profile configurations so formed that the members can be interlockingly engaged along such edges to form floors, walls, or the like.

This application is a continuation-in-part of my abandoned applications Serial No. 557,487, filed January 5, 1956, Serial No. 558,716, filed January 12, 1956, and Serial No. 560,387, filed January 20, 1956.

The economies achieved in the fabrication of metallic structural members by extrusion processes are well-known. Such extrusions, when of aluminum, not only are light in weight but are structurally strong and also can be manufactured in an infinite variety of relatively complicated profile configurations. The lateral or transverse dimensions of such extrusions are limited, to some extent, by the capabilities of modern extrusion processes and apparatus, but a number of panel-like extrusions can be readily joined together along their side edges to define walls, floors, and the like, at considerable savings over comparable one-piece walls of metal formed by processes other than extrusion. It also will be seen that walls formed of extruded sections readily lend themselves to dimensional variations by using extruded sections of different lateral dimensions or by changing the number of extruded sections utilized in any one wall.

Accordingly, it is an object of this invention to provide metallic extruded sections particularly adapted to be interlockingly engaged, with great facility, along their side edges to form highway signs, curtain walls, vehicle side walls, vehicle floors, liner panels, and the like.

It is another object of this invention to provide panel-like metallic extruded sections having edge profile configurations which will enable the sections to be interlockingly engaged along their side edges in such a manner as to form a strong moisture-resistant joint therebetween.

It is another object of this invention to provide panel-like metallic extruded sections of the type under consideration that can be interlockingly assembled and secured to a backing support, such as joists or studs, by concealed fasteners.

It is another object of this invention to provide panel-like metallic extruded sections which can be interlocked as aforedescribed in such a manner that a large portion of a load on one section, normal to the planar disposition thereof, will be transferred to an adjacent section.

It is another object of this invention to provide interlocking metallic extruded sections of the type aforedescribed with special edge profile configurations which permit greater extrusion tolerances by providing a limited amount of yieldability or flexibility of the metal parts at the joint when the sections are being assembled into interlocking engagement.

It is another object of this invention to provide an improved double wall assembly that can be assembled rapidly and with great facility from a number of interlocking metallic extruded sections.

It is still another object of this invention to provide an improved baseboard construction utilizing metallic extruded sections having an interlocking joint therebetween.

Other objects and advantages of the invention will become apparent from the following description and accompanying drawings, in which:

FIGURE 1 is a fragmentary transverse sectional view of a section of a floor or the like formed by a number of metallic extruded sections interlocked in accordance with this invention, and illustrating the method of interlockingly engaging one section with an adjacent section.

FIGURE 2 is a view corresponding to FIGURE 1 but illustrating a modified type of interlocking joint between adjacent sections.

FIGURE 3 is an enlarged fragmentary view corresponding to a portion of FIGURE 1 but illustrating another modification of the interlocking joint between adjacent sections.

FIGURE 4 is a view corresponding to FIGURE 1 but illustrating another modification of the interlocking joint between adjacent sections.

FIGURE 5 is a view corresponding to FIGURE 1 but illustrating another modification of the interlocking joint between adjacent sections.

FIGURE 6 is an enlarged fragmentary view of a portion of FIGURE 5.

FIGURE 7 is an enlarged sectional view showing a further use of an interlocking joint of the type shown in FIGURE 5.

FIGURE 10 is a fragmentary vertical sectional view of a wall formed from interlocked extrusions embodying this invention and illustrating another modification of the joint of the general type shown in FIGURES 8 and 9.

FIGURE 11 is a fragmentary vertical sectional view of a double wall construction formed of interlocked metallic extruded sections embodying this invention.

FIGURE 12 is a fragmentary perspective view, partly in vertical section, showing a somewhat modified type of double wall construction.

FIGURE 13 is a fragmentary perspective view corresponding to FIGURE 12 but illustrating a further modification of a double wall construction embodying this invention.

FIGURE 14 is a fragmentary perspective view, partly in vertical section, illustrating the method of assembling a part of the wall shown in FIGURE 13.

FIGURE 15 is a view corresponding to FIGURE 14 but illustrating the method of assembling another part of the wall shown in FIGURE 13.

FIGURE 16 is an enlarged vertical sectional view of a lower portion of the wall shown in FIGURE 13.

FIGURE 17 is an enlarged vertical sectional view of an intermediate portion of the wall shown in FIGURE 13.

FIGURE 18 is a fragmentary perspective view, partly in vertical section, illustrating a floor, side wall, and baseboard construction embodying this invention.

FIGURE 19 is a reduced fragmentary perspective view corresponding to FIGURE 18, but illustrating the method of assembling the baseboard shown in the latter figure.

Figure 8:
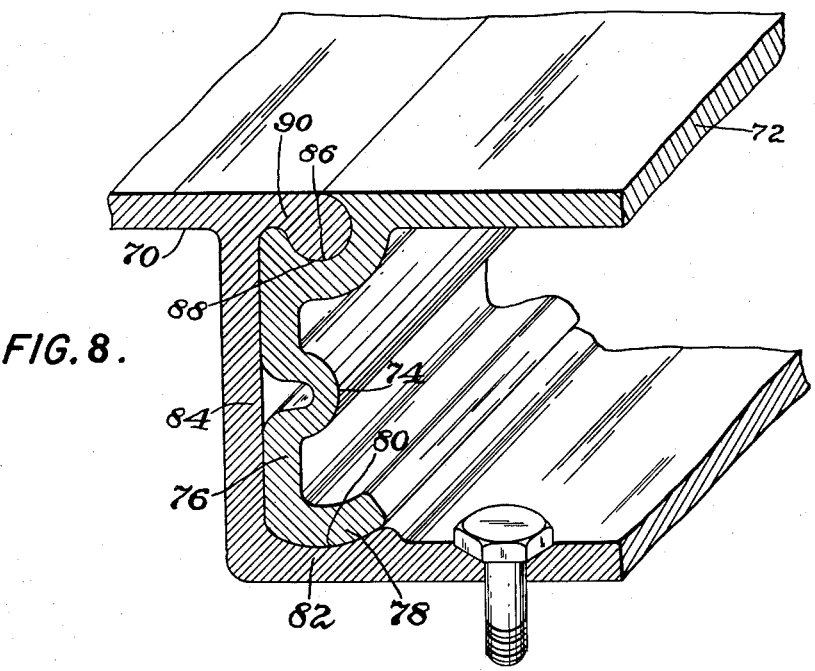
FIGURE 8 is an enlarged fragmentary perspective view illustrating another modification of the joint of the general type shown in FIGURE 1.

Referring now to FIGURE 1 of the drawings there are shown three members or metallic extruded sections indicated generally as 1, 2 and 3. The intermediate and right-hand members, 2 and 3, respectively, are shown as being interlocked, while the left-hand member 1 is shown in position of partial engagement with the intermediate member 2 preparatory to being moved into full interlocking engagement therewith. Each section or member is in the form of a panel 4 having a flat outer face and preferably provided on its inner face with one or more integral T-shaped longitudinal stiffening ribs 5.

At the joint between adjacent sections, one section, along its side edge, is provided with a tongue-like profile configuration 6. The outer side of the tongue 6 is flat and merely constitutes a continuation of the flat outer face of the panel 4, while the inner side of the tongue has a convexly rounded bead-like surface 6X. At its inner side the convexly rounded surface 6X on the tongue 6 merges smoothly with a round bottom groove or channel 7 that, in turn, merges smoothly with the outer surface of a rib 8 extending from the inner face of the panel 4. In a sense, the tongue-like configuration 6 may be termed a lip which overhangs the outer side of the rib 8. At its free end and on its outer side, the rib 8 is provided with a flange-like extension 9 that may have a flat bearing undersurface for engagement and securement, as later explained, against a backing or supporting member (not shown). The inner side of the extension 9, i.e., the upper side thereof as shown in FIGURE 1, is provided with a channel-like configuration or seat 10. The convexly rounded surface 6X of the tongue 6 and concavely rounded surface of the channel 10 in the extension 9 have substantially the same center of curvature C, as shown at the right-hand side of FIGURE 1, with the radius R1 of the tongue surface 6X being smaller than the radius R2 of the channel 10. Preferably, the center of curvature C is disposed substantially at the surface of the outer side of the tongue 6, again as shown at the right-hand side of FIGURE 1.

The side edge of the other section at the joint is provided with an edge profile configuration that defines a groove 11 at the edge of the outer face of the panel 4. The outer edge of the groove 11 is offset somewhat inwardly of the outer face of the panel 4 and merges smoothly into a rib 12 extending from the inner face of the panel. At its free end and at its inner side the rib 12 is provided with a flange-like extension 13 that is convexly curved at its outer side. The groove 11, outer surface of the rib 12, and outer surface of the extension 13 are complementary and conform respectively to the rounded surface 6X of the tongue, outer surface of the rib 8, and the channel 10. Consequently, these conforming surfaces are in snug engagement when adjacent sections are interlocked.

In order to assemble a pair of sections into interlocking engagement, the groove 11 along one edge of a section is partially engaged with the tongue 6 along the edge of another section, as shown at the left-hand side of FIGURE 1, with the sections tilted relative to each other. The sections then may be relatively rotated, or one section may be rotated relative to the other, to bring the sections into the same planar disposition, so that their complementary and conforming surfaces will become fully interlocked as shown at the right-hand side of FIGURE 1. In a sense, the convexly rounded side 6X of the tongue or lip 6, the opposed concavely rounded seat 10 on the extension 9, and the outer side of the rib 8 define a channel-like configuration extending along and in the edge of a section. At the same time, the complementary groove 11, rib 12 and extension 13 along the edge of another section may be considered to define a tongue extending along such edge.

While each extruded metal section illustrated in FIGURE 1 has been described as having profile configurations along its opposite edges that are complementary to each other, it will be realized that the principal consideration here is the joint between two adjacent sections, because, depending upon its particular use, one section may have an interlocking edge profile configuration along one side edge only, or as later described with particular reference to FIGURE 7, one section may have identical profile configurations along its opposite edges.

Referring now to the modification in FIGURE 2 of the drawings, the tongue or lip 14 along the edge of one section has a concavely curved inner face 14'. The channel or seat 10X in the inner side of the extension 9 of the rib 8 has a radius of curvature R4 much smaller than the radius of curvature R2 of the seat 10 shown in FIGURE 1. In fact, the center of curvature C' of the seat 10X is located relatively closely adjacent to the latter, as shown at the right-hand side of FIGURE 2. It also will be noted that the concavely rounded surface 14' of the tongue or lip 14 has a greater radius of curvature R3 than the radius of curvature R1 for the surface 6X shown in FIGURE 1. The center of curvature of the radius R3 is common to the center of curvature C' for the radius R4.

The edge of the other section at the joint is provided with a groove 15 in the outer face of such section complementary to the tongue 14. The groove 15 is undercut, however, as respects the outer face of the panel 4. It also will be seen that the tip of the tongue 14 is offset inwardly of the outer face of its section. The rib 12 on the other section is provided, instead of a flange-like extension, with a bulbous profile configuration 16 substantially complementary and conforming to the seat 10X on the inner side of the extension 9.

Because the groove 15 is undercut and the tongue 14 fits snugly therewithin when adjacent sections are interlocked, a portion of the panel 4 at the inner edge of the groove 15 overhangs or overlies a portion of the tongue 14 on the other section. Consequently upward bending of the tongue 14, on the imposition of lateral forces tending to separate two interlocked sections, as indicated by the oppositely facing arrows m at the right-hand side of FIGURE 2, is resisted more effectively than in the joint construction illustrated in FIGURE 1.

Referring now to FIGURE 3 there is illustrated a joint construction similar to that shown in FIGURE 1 but wherein the tongue or lip 6' on one section is extended further beyond the rib 8, and the channel or seat 10' in the extension 9 on the rib 8 is spaced outwardly somewhat from the outer side of such rib. This greater length of the tongue 6' and spacing of the seat 10' is indicated by the increase in the dimension b. As a result of this construction, the ribs 12 and 8 on adjacent sections are spaced apart when such sections are interlocked. Consequently, increased flexibility or yieldability is provided for the interlocking parts at the joint during assembly. In other words, the length of the rib 12 can be increased slightly, or the length of the rib 8 can be decreased slightly and still permit assembly of two adjacent sections because the portions thereof adjacent the interlocking joint therebetween will flex slightly during assembly. It will be seen that such flexing of the parts will enable an oversize edge tongue (defined by the groove 11, rib 12, and extension 13) to be engaged within an undersize edge channel (defined by the tongue 6', rib 8, and extension 9) in order to achieve an extremely tight interlocked joint between two sections.

It will be seen that in all three modifications, shown in FIGURES 1, 2 and 3, the extension on the rib 8 extends beyond the outer edge of the seat or channel 10, 10X or 10' to provide a concealed fastening strip which may be secured, as by a bolt or screw 26 (FIGURE 3) to a backing support (not shown). In this connection, it is obvious that sections of the type shown in FIGURES 1 and 3 can be rapidly assembled together and secured to a backing support in succession.

Referring now to FIGURE 4 there is shown a further modification of a joint similar in some respects to that shown in FIGURE 2. In this modification the tongue of lip 14X on one section is extended further outwardly beyond the rib 8 than in the modification shown in FIGURE 2 but such tongue is provided with a concavely curved undersurface 14" closely adjacent the rib 8 and having a radius R5. The extension 9X on the rib 8 is quite short but provided on its inner side with a bead-like convexly rounded profile configuration 23 having a radius R6 and a center of curvature C" at the outer side of the extension. This center of curvature C" also is the center of curvature for the concavely rounded undersurface 14" of the tongue. The rib on the other section in a sense is of double-wall construction, having an outer wall 24 connected to an inner wall 12 by a flange-like portion 22. Adjacent its outer edge, the portion 22 is provided with a groove 21 complementary and conforming to the bead-like configuration 23 on the extension 9X. At its base, i.e., at that end thereof adjacent the panel 4, wall 24 is provided with an inturned flange or extension 25 having a convexly rounded outer surface complementary and conforming to the concavely rounded undersurface 14" of the tongue 14X. The tip portion of the lip 14X is downturned and complementary and conforming to a groove 15X, similar to the groove 15 in FIGURE 2, adjacent the base of the wall 12.

As will be seen from an inspection of the right-hand side of FIGURE 4, when two adjacent sections are assembled, the lip 14X bridges the gap at the base of the two walls 12 and 24 and interengages within the groove 15X. Consequently, the profile configurations at the joint of two assembled sections essentially define a box girder construction that greatly increases the strength of the joint, particularly as respects loads applied to the assembled sections normal to the plane of such sections.

Referring now to FIGURE 5, there is shown an assembly of interlocked extrusions especially adapted for use as the floor of a dry cargo truck or trailer. Each metallic extruded section includes a panel 4 provided on one face therewith with a plurality of T-shaped stiffening ribs 5 and on the other face thereof with V-shaped grooves 26 registering with the ribs 5. Essentially, the ribs 5 are bridged by panel portions having down-turned edges at the ribs to provide an arch-like construction that increases the load-carrying strength of the sections. The edges of each section are provided with profile configurations, very similar to those shown in FIGURE 1, for interlocking engagement of adjacent sections. Thus, one section is provided along one edge with a lip or tongue-like configuration 28 which has a convexly-curved bead-like undersurface 30 that overhangs a rib 32 having an extension 34 on its free end provided with a concavely curved seat 36 opposed to the tongue 28. The tip 38 of the tongue 28, however, is offset inwardly of the flat outer or load-carrying face of each section, as is best shown in FIGURE 6, and the tongue is provided with a surface that is inclined backwardly from the tip 38 and intersects with the flat outer face of the section to form a corner 40. The center of curvature of the rounded surface 30 and of the seat 36 coincides with the corner 40, as shown by the radius lines at the left hand side of FIGURE 5 and in FIGURE 6.

The other interlocking section is provided along one edge with a groove 42 complementary and conforming to the tongue 28 on the first section, similar to the construction shown in FIGURE 1. The groove 42, however, is undercut as respects the outer or working face of the section so that the inner edge of the groove coincides with the center of curvature 40 when the sections are assembled. As a result of this construction, upward bending of the tongue 28 is more effectively resisted on the imposition of lateral separating forces on two interlocked sections. The other interlocking section also has a rib 44 and extension 46 thereon complementary to the outer side of rib 32 and seat 36, respectively, the same as the construction shown in FIGURE 1.

Referring now to FIGURE 7 there is shown an arrangement for connecting identically configured edges of two adjacent extruded sections. This is accomplished by means of an intermediate metallic extruded locking strip 48 having identical profile configurations on its opposite sides. Each side configuration provides a lip 50 having a rounded undersurace 52 and a flange-like extension 54 having a rounded upper surface or seat 56 substantially identical to the construction shown in FIGURES 5 and 6. Of course, the edges of sections adapted to be connected by means of the strip 48 have profile configurations that provide groove 58 and rib extensions 60 having oppositely facing curved surfaces, 62 and 64, respectively, identical to those shown in FIGURES 5 and 6. Preferably, the extensions 54 on the connecting strip 48 are extended outwardly beyond the outer edges of the channel-like seats 56 to provide fastening strips that may be utilized to secure the connecting strip to a backing support 66, such as a floor joist, as by screws 68.

In an assembly of the type shown in FIGURE 7, the strip 48 may first be fastened in position in the center of a floor that is to be constructed, and then assembly of the floor with extruded metal sections can proceed in opposite directions from the strip.

Referring now to FIGURE 8 there is shown a joint between two interlocked metallic extruded sections 70 and 72 similar to the joint shown in FIGURES 1, 3 and 6. As aforedescribed, however, with reference to FIGURE 3, it sometimes is desirable to provide for a certain degree of flexibility or yieldability of the interlocking edge configurations of the sections in order to accommodate oversized or undersized parts. Such yieldability is accomplished in the joint construction illustrated in FIGURE 8 by means of a longitudinal U-bend 74 in the rib 76. Such U-bend 74 provides a certain degree of yieldability and also imparts a spring-like action to the rib 76. Consequently, if the rib 76 is somewhat oversize, it will be possible to assemble the two sections 70 and 72 into interlocking engagement, all as illustrated at the left-hand side of FIGURE 1, because the rib 76 will yield sufficiently during the assembly operation to enable the interlocking engagement to be executed. At the same time, it will be seen that the spring-like action of the U-bend 74 will make for an extremely tight engagement between the extension 78 on the rib 76 and the seat 80 in the extension 82 on the rib 84 and between the groove 86 and the rounded undersurface 88 of the lip 90.

Figure 9:
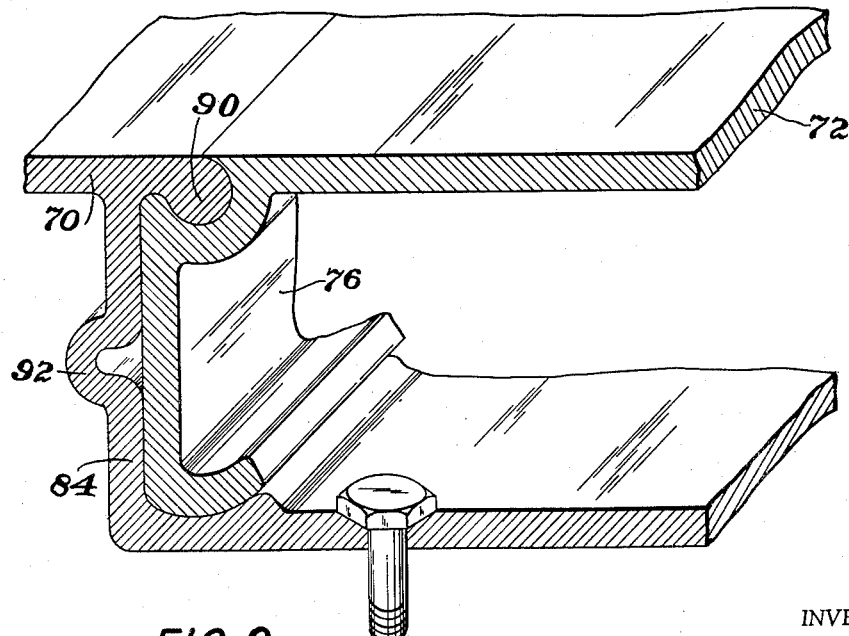
FIGURE 9 is a view corresponding to FIGURE 8 but showing a slightly modified form of the joint shown in FIGURE 8.

Referring now to FIGURE 9, there is shown a joint construction similar to that shown in FIGURE 8, but wherein the U-bend 92 is provided in the rib 84 instead of in the rib 76. The arrangement shown in FIGURE 9 has certain advantages, however, over that shown in FIGURE 8. In particular, it will be noted that any loads imparted to the left-hand section 70, normal thereto and adjacent the joint, will be transmitted by the overhanging lip 90 directly to the rib 76 which is straight and substantially unyielding. Consequently, the U-bend 92 in the rib 84 does not tend to cause any increase in the deflection of the section 70 adjacent the joint when such section is under load normal to the plane thereof.

Referring now to FIGURE 10, there is shown a further modification of a joint of the type shown in FIGURE 8. In this modification, the interlocked sections are shown as being employed to form a vertical wall, such as an interliner for a side wall of a vehicle. The concealed fastening strips 94 of the several sections may be secured as by bolts or screws 96, to horizontal backing support members 98 of the vehicle side wall.

In this modification, the rib 100 of each section is provided with a longitudinal U-bend 102 to again impart the yieldability and spring-like action described above with reference to FIGURE 8. In this modification, however, a sealing gasket 104 is carried within the concavity defined by such U-bend 102 and projects slightly from such concavity so that it will be in snug sealing engagement with the side of the rib 106 on the other section at the joint. Such arrangement, of course, renders the joint extremely moisture tight. Preferably, the U-bend 102 is of a somewhat dovetailed configuration in profile, i.e., narrower at its mouth than further within the concavity, in order to assist in retaining the sealing gasket 104 within such concavity.

Referring now to FIGURE 11, there is shown a portion of a double wall made up of interlocked metallic extruded sections having interlocking joints in accordance with this invention. Each of the sections is formed generally in accordance with the sections shown in FIGURE 1, having a panel portion 110 provided with a flat central outer face and with one or more generally T-shaped stiffener ribs 112 on its inner face. Adjacent its marginal side edges, the panel portion 110 of each section is curved inwardly, as at 114, so that when the sections are interlocked, as shown at the upper portion of FIGURE 11, the curved margins 114 form a horizontal channel-like recess 116 in the outer faces of the double wall.

Along one side edge each section is provided with a rib 118 extending from its inner face, and a tongue-like configuration or lip 120 that overhangs the outer side of such rib. The inner surface of the lip 120 is provided with a channel-like configuration or round-bottomed groove 122 having a relatively small radius of curvature similar to the groove 10X shown in FIGURE 2. Adjacent its free edge, the rib 118 is provided, on its outer side, with a flange-like extension 124 provided, on its inner surface, with a channel or concave seat 126 having a center of curvature substantially coinciding with the center of curvature of the groove 122 in the lip 120. At both ends, the extension 124 is provided with flanges 128 extending away from the inner face of the section and generally parallel to the rib 118 so that the extension, together with the flanges, may partially embrace a horizontal beam 130, and be secured thereto, as by screws 132. The section also preferably is provided, adjacent its lip 120, with a rib 134 extending outwardly from its outer face. The rib 134 preferably is provided with longitudinally spaced openings 136 therein, so that the rib can be used as fastening means (as, for example, for fastening freight to the wall when such wall is in a freight vehicle). In this connection, it will be noted that the rib 134 does not extend outwardly beyond the mouth of the concavity 116 so that when the rib is not used for fastening purposes, cargo can be disposed substantially flush with the outer flat surfaces of the sections.

The edge of the other section at the joint is provided with a bulbous configuration 138 substantially complementary and conforming to the round-bottomed groove 122 in the lip 120 of the other section. Extending from the inner face of the other section at the same edge, is a rib 140 having a flange-like extension 142 on its free end substantially complementary and having surfaces conforming to the seat or channel 126 in the extension 124 on the one section. The sections are interlocked by the same procedure followed for interlocking the sections shown in FIGURE 1. In this connection, it is pointed out that identical sections are secured on the opposite sides of the beams 130 so as to build up the hollow wall construction.

Referring now to FIGURE 12 there is shown a modification of the double wall construction shown in FIGURE 12. In the construction shown in FIGURE 12, the outer faces of the sections are completely flat so as to form a substantially uninterrupted smooth flat surface at the joint between adjacent sections. The joint is of substantially the same type illustrated in FIGURE 1 wherein a lip 144 on one section has a convexly rounded undersurface 146 complementary and fitting within a groove 148 in the edge of an adjacent section and also wherein the one section is provided with a rib 150 extending from its inner face adjacent the lip 144 and with an extension 152 on the rib provided with a concave seat or channel 154 opposed to the lip. The other section is provided with a rib 156 extending from its inner face adjacent the outer edge of the groove 148 and with an extension 158 on such rib substantially complementary to the seat 154 in the rib 150. In this embodiment, the extensions 152 on the ribs 150 are provided with flanges 160, in the same manner as shown in FIGURE 11, so as to partially embrace horizontal beams 162 and to be secured thereto by screws 164.

Referring now to FIGURES 13-17 there is shown a further modified form of double wall construction. In the example illustrated in these figures, there is shown a hollow bulkhead construction useful for cargo separation purposes in railway freight cars. The bulkhead construction is made up of an upper and a lower part 166 and 168 adapted to be pivotally connected together by links (not shown) for relative folding movement about a horizontal axis. The lower part of the bulkhead or double wall comprises a lower base member 170 in the form of a generally U-shaped metallic extrusion having the ends of its legs inturned and bridged by a plate 172 that is secured to such legs by any appropriate fastening means, such as by welding. The base member 170 thus is in the form of a hollow box girder. The base of the U-shaped extrusion is provided, along its outer opposite edges, with lip-like edge configurations or tongues 174, substantially identical to the edge configurations 28 shown in FIGURES 5 and 6. Along the center of the upper face of the base member 170 is a flange or rib-like configuration 176 having concavely rounded channels or seats 178 on its opposite sides so that each seat is opposed to the convexly rounded undersurface 180 of a lip 174.

The double wall construction is built up from the base member 170 by opposed pairs of extruded sections each interlocked along its lower edge with the base member and provided along its upper edge with an inturned flange or rib 182. The ribs 182 of each pair have abutting extensions 184 at the outer sides of their free edges, such extensions being secured together, as by means of rivets 186.

Along its lower edge, each section is provided on its outer face, with an undercut groove 188, substantially identical to the groove 42 shown in FIGURE 6, and complementary and conforming to the lip 174. Extending from the inner face of each extruded section, adjacent the groove 188, is a rib 190 having at its free edge an extension 192 provided with a convex outer surface substantially complementary and conforming to the seat 178 on the base member 170. Obviously, the joints between the base member 170 and each extruded section are substantially identical to the joints between the two sections shown in FIGURE 6.

The sections are each provided along their upper edges with a tongue-like configuration or lip 194, identical to the lip 174 on the base member 170, and overhanging the outer side of the rib 182. Likewise, the extensions 184 on the ribs 182 are provided, on their inner sides, with concavely rounded channels or seats 196 opposed to the convexly rounded undersurface of the lips 194.

As a result, the lower part 168 of the double wall can be built up to a substantially indefinite length by simply adding additional pairs of sections and interlocking the same in the manner illustrated in FIGURES 13 and 16. In this connection, it will be seen that the wall is built up simply by partially engaging the lower edges of opposed pairs of sections with the base member 170, or with a pair of opposed wall sections that have already been secured together, and then by pivoting or relatively rotating the sections toward each other in the manner illustrated in FIGURE 14, so that the extensions will be disposed in abutting relationship and may be secured together by rivets 186, or the like.

In order to finish off the upper edge of the lower part 168 of the double wall, the uppermost opposed pair of extruded sections are provided with the configurations best illustrated in FIGURE 17 wherein the sections are provided with inturned flanges 198 that overlap each other and are secured together by means of blind rivets 200. One of the inturned flanges 198 may also have, in its outer surface, a substantially groove-like configuration 202 for the reception of a complementary tongue-like configuration 204 on the lower edge of the upper part 166 of the double wall. This upper part 166 is formed in generally the same manner as the lower part 168 of the double wall, but simply is an upside-down version of the latter.

The side edges of the double wall construction illustrated in FIGURES 13-17 may be finished off by channel-like members (not shown), preferably of extruded metal, which partially embrace the marginal edges of the double wall and are secured thereto in any appropriate manner.

Referring now to FIGURES 18 and 19 of the drawings, there is shown a wall, floor and baseboard construction embodying many of the above disclosed principles of this invention. In this embodiment of the invention, a side wall member 206, preferably of extruded metal, is formed as a support for an edge of a floor made up of a plurality of extruded metal sections 208 that are interlocked by joints substantially identical to that illustrated in FIGURE 6. The wall member 206 is provided, along its lower edge with a horizontal flange 210 which supports the ends of the interlocked floor sections 208. On the other face of the wall member 206 is a flange 212 which may rest upon a horizontally extending beam 214 and be secured thereto by any appropriate means (not shown). Between the ends of the floor sections 208 and the wall member 206 is a horizontally extending crevice 216 which is closed and finished off by a baseboard 218 embodying this invention.

Somewhat above the upper surface of the floor sections 208, the wall member 206 is provided with a horizontally extending groove 220 provided with an undercut upper side wall. The profile configuration of the groove 220 is substantially identical to that of the groove 42 illustrated in FIGURE 6. As will be seen in FIGURE 18 of the drawings, the lower edge of the groove 220 is offset somewhat outwardly of its upper edge so that the portion of the wall member 206 below the groove is offset outwardly from the wall portion of the member 206 extending above the groove. The baseboard 218 is generally L-shaped in transverse section and has a tongue-like configuration 222 at its upper edge substantially complementary and conforming to the groove 220. The width of the upright flange 224 of the baseboard 218 is substantially equal to the height of the groove 220 above the floor sections 208, so that when the baseboard is assembled to the wall member 206, the lower flange 226 of the baseboard overlies and conceals the crevice 216, as is shown in FIGURE 18. In this connection it will be seen that the baseboard 218 is assembled by partially engaging the tongue 222 within the groove 220, in the manner shown in FIGURE 19, and then allowing the baseboard to pivot down about such engagement into the position shown in FIGURE 18, wherein the horizontal flange 226 of the baseboard overlies the marginal end portions of the floor sections 208. It also will be seen that the upright flange 224 of the baseboard 218 engages the outwardly offset portion of the wall member 206 below the groove 220, so that the upright flange of the baseboard constitutes a substantially flush extension of the portion of the wall member above the groove. At its upper edge, the wall member 206 may have an out-turned flange 228 provided on its upper surface with a horizontal tongue 230 for engagement within a groove 232 in a wooden wall board 234.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. A set comprising at least two panel-like extruded metal sections adapted to be assembled into snug interlocking engagement along their side edges to form at least a portion of a floor, a wall, or the like, a first of said sections having along one side edge an integral rib projecting from one face of said section, a lip along said edge overhanging the outer side of said rib and having a curved inner surface, a flange-like extension along the free edge of said rib at the outer side of the latter and having a curved inner surface opposed to said lip inner surface, said inner surfaces having a substantially common center of curvature, a second of said sections having along one side edge an integral rib provided with a pair of curved surfaces facing oppositely and outwardly of the two faces of said second section, one adjacent the base of said last-mentioned rib, and one adjacent its free edge, said pair of curved surfaces being complementary and conforming respectively to said curved inner surfaces on said first section for snug interfitting engagement therewith when said sections are interlocked, the arrangement being such that one of said outwardly-facing curved surfaces on said second section can be partially engaged with its complementary inner curved surface on said first section with said sections tilted relative to each other, and then said sections relatively rotated about the engaged surfaces into the same planar disposition to assemble said sections into interlocking engagement with all of said conforming surfaces in snug engagement.

2. The structure defined in claim 1 in which the inner surface of the lip is convexly curved with the center of curvature thereof substantially at the other face of the first section.

3. The structure defined in claim 1 in which the inner surfaces of the lip and of the flange-like extension are concavely curved.

4. The structure defined in claim 1 in which the inner surface of the lip is concavely curved and the inner surface of the flange-like extension is convexly curved with the center of curvature of said surfaces substantially at the outer face of said extension.

5. The structure defined in claim 1 in which the outer faces of the ribs are complementary and have surfaces conforming to each other for snug interengagement when the sections are assembled.

6. The structure defined in claim 1 in which the rib on the second section projects from one face thereof that is substantially flush with the other face of the first section when said sections are assembled, and the curved surface adjacent the base of said second section rib defines a portion of a groove which is undercut as respects said one face of said second section, the lip being complementary and having surfaces conforming to said groove, whereby a portion of said second section adjacent said groove overhangs said lip when said sections are assembled.

7. The structure defined in claim 1 in which the inner surface of the lip is convexly curved with a center of curvature substantially at the other face of said first section, the rib on the second section projects from one face thereof that is substantially flush with the other face of said first section when said sections are assembled, and the curved surface adjacent the base of said second section rib defines a portion of a groove that is undercut as respects said one face of said second section, said lip being complementary and having surfaces conforming to said groove, whereby a portion of said second section adjacent said groove overhangs said lip when said sections are assembled, said one face of said second section constituting a substantially uninterrupted continuation of said other face of said first section when said sections are assembled, and the inner edge of said groove substantially coinciding with the center of curvature of said curved surface adjacent the base of said second section rib.

8. The structure defined in claim 1 in which one of the ribs has a longitudinally-extending U-bend therein with the concavity of said bend facing the other rib, when the sections are assembled, to thus provide a spring-like quality to said one rib, the proportions of said ribs being such that said conforming surfaces will be in tight engagement, when said sections are assembled, as a result of said U-bend.

9. The structure defined in claim 1 in which one of the ribs has a longitudinally-extending U-bend therein with the concavity of said bend facing the other rib, when the sections are assembled, to thus provide a spring-like quality to said one rib, the proportions of said ribs being such that said conforming surfaces will be in tight engagement, when said sections are assembled, as a result of said U-bend, and including a gasket carried in and projecting from said U-bend concavity for sealing engagement with said other rib when said sections are assembled.

10. The structure defined in claim 1 wherein the rib on the second section projects from one face thereof that is substantially flush with the other face of the first section when said sections are assembled, said second section is hollow and provided with spaced side-walls connected together only at the outer edge of said section rib, the lip is extended and has a concavely curved inner surface, the inner of said walls is provided adjacent its base with a groove that is undercut as respects said one face of said second section, and the end of said lip is complementary and conforms to said groove, whereby when said sections are assembled, said second section rib, together with said extended lip, define a box girder.

11. A set comprising at least two panel-like extruded metal sections adapted to be assembled into snug interlocking engagement along their side edges to form at least a portion of a floor, a wall, or the like, a first of said sections having along one side edge an integral rib projecting from one face of said section, a lip along said edge overhanging the outer side of said rib and having a convexly curved inner surface, a flange-like extension along the free edge of said rib at the outer side of the latter, a second of said sections having along one side edge an integral rib and an outwardly-facing groove extending along and adjacent the base of said latter rib, said groove in transverse section having a surface that is curved and complementary and conforms to said lip inner curved surface, a flange-like extension along the free edge of said second section rib at the inner side of the latter, said last-mentioned rib and extension being adapted to fit within the space defined by said lip, rib, and extension on said first section when said sections are assembled, and the arrangement being such that said curved surfaces can be partially engaged with said sections tilted relative to each other, and then said sections relatively rotated into the same planar disposition to assemble said sections into interlocking engagement with said conforming surfaces in snug engagement, there being surfaces on said extensions adapted to be interengaged when said sections are assembled to restrain said relative rotation beyond the point of said planar disposition of said sections.

12. A set comprising at least two panel-like extruded metal sections adapted to be assembled into snug interlocking engagement to form at least a portion of a floor, a wall, or the like, with one face of each section substantially flush with one face of the other to define a substantially uninterrupted smooth surface on one face of the floor, etc., at the joint between said sections, a first of said sections having along one side edge a tongue-like configuration that side of which is opposite said one face of said section being convexly-curved and bead-like with a center of curvature at said one face of said section, the curved surfaces of said one side of said configuration extending on opposite sides of a plane which is generally normal to said section and includes said center of curvature, the tip of said configuration being offset inwardly of said one face of said section, a second of said sections having in one face thereof a straight undercut groove complementary and having surfaces conforming to said tongue-like configuration for interlocking engagement therewith, one edge of said groove being offset inwardly of said one face of said second section and the other edge of said groove substantially coinciding with said center of curvature when said sections are assembled, the construction and arrangement of said sections being such that said tongue-like configuration can be partially engaged in said groove with said sections tilted relative to each other, and then said sections relatively rotated into the same planar disposition to assemble said sections into interlocking engagement with said conforming surfaces in snug engagement, there being surfaces on said sections separate from said tongue-like configuration and said groove adapted to be engaged when said sections are assembled to restrain said relative rotation beyond the point of said planar disposition of said sections.

13. The structure defined in claim 12 including ribs on the sections, one extending along the side edge of the first section and projecting from the other face thereof inwardly of the tongue-like configuration, and the other extending along the inwardly offset edge of the groove of the second section and projecting from the other face thereof, and wherein the separate surfaces are formed on said ribs.

14. The structure defined in claim 12 in which the second section has an inward offset in its one face at and continuing beyond the offset edge of the groove, and the separate surfaces are defined by the other face of the first section and the inwardly offset portion of said one face of said second section.

15. A hollow wall assembly comprising: a pair of panel-like generally-rectangular extruded metal sections arranged in parallel generally-coextensive overlying relationship and having inturned flanges along a first pair of aligned side edges; means fastening said flanges together; an elongated base member extending along a second pair of aligned side edges of said sections opposite said first pair; and pairs of pivotally interlocked complementary configurations integral with said base member and integral with said sections adjacent the edges of the latter comprising said second pair, said configurations securing said sections to said member, one of the configurations of each of said pairs defining a channel provided with curvel side walls having a substantially common center of curvature located at unequal distances from said walls, and the other configuration of each of said pairs defining a tongue substantially conforming to said channel and in snug interfitting engagement therein, the arrangement being such that for assembly the configuration on one section and the corresponding configuration on said base member can be partially engaged with said one section tilted outward relative to the plane of said wall, and then said one section pivoted about said engagement into said plane to fully engage said configurations, the other section can likewise be secured to said base member, and then said inturned flanges fastened together.

16. The structure defined in claim 15 in which each channel is on the base member and each tongue is on the corresponding section and is defined by an inturned flange having outwardly and oppositely-facing curved surfaces at its base and at its free edge.

17. The structure defined in claim 15 including additional integral configurations on the sections adjacent their flanged edges comprising the first pair, said additional configurations being identical to those on the base member for assembly to another pair of like sections.

18. The structure defined in claim 15 in which the flanges directly engage each other.

19. The structure defined in claim 16 in which the outer side wall of each channel is formed by a lip extending along one edge of the base member and the center of curvature is at the outer side of said lip.

20. The structure defined in claim 19 in which the curved surface at the base of the flange on each section defines a portion of a groove that is undercut as respects the outer face of said section, and the center of curvature substantially coincides with the outer edge of said groove.

21. A set comprising at least two panel-like extruded metal sections adapted to be assembled into snug interlocking engagement along their side edges to form at least a portion of a floor, a wall, or the like, a first of said sections having along one side edge a profile configuration defining a channel in said edge provided with curved side walls having a substantially common center of curvature located at unequal distances from said walls, a second of said sections having along one side edge a profile configuration defining a tongue substantially complementary and conforming to said channel for snug interfitting engagement therewith when said sections are interlocked, the arrangement being such that said tongue can be partially engaged in said groove with said sections tilted relative to each other, and then said sections relatively rotated about said center of curvature into the same planar disposition to assemble said sections into interlocking engagement.

References Cited in the file of this patent

UNITED STATES PATENTS

| | | |
|---|---|---|
| 1,798,897 | Olson | Mar. 31, 1931 |
| 1,913,342 | Schaffert | June 6, 1933 |
| 1,988,603 | McLaren et al. | Jan. 22, 1935 |
| 2,007,354 | Vass | July 9, 1935 |
| 2,164,681 | Fould | July 4, 1939 |
| 2,449,292 | Gillett et al. | Sept. 14, 1948 |
| 2,644,552 | MacDonald | July 7, 1953 |
| 2,682,938 | MacDonald | July 6, 1954 |
| 2,717,060 | Collins | Sept. 6, 1955 |
| 2,786,556 | Constance | Mar. 26, 1957 |

OTHER REFERENCES

Designing With Aluminum Extrusions, Reynolds Metals Company, 1952, copyrighted 1950, page 14.